US011998773B2

(12) United States Patent
Park et al.

(10) Patent No.: US 11,998,773 B2
(45) Date of Patent: Jun. 4, 2024

(54) FILTER AND MASK

(71) Applicant: 3M INNOVATIVE PROPERTIES COMPANY, St. Paul, MN (US)

(72) Inventors: HyoungSun Park, Seoul (KR); Jung Han Kim, Seoul (KR); Kyungsik Dan, Suwon-si (KR)

(73) Assignee: 3M Innovative Properties Company, St. Paul, MN (US)

( * ) Notice: Subject to any disclaimer, the term of this patent is extended or adjusted under 35 U.S.C. 154(b) by 708 days.

(21) Appl. No.: 15/733,568

(22) PCT Filed: Mar. 4, 2019

(86) PCT No.: PCT/IB2019/051727
§ 371 (c)(1),
(2) Date: Aug. 28, 2020

(87) PCT Pub. No.: WO2019/171249
PCT Pub. Date: Sep. 12, 2019

(65) Prior Publication Data

US 2020/0406071 A1 Dec. 31, 2020

(30) Foreign Application Priority Data

Mar. 8, 2018 (KR) ........................ 10-2018-0027305

(51) Int. Cl.
*A62B 23/02* (2006.01)
*A62B 18/08* (2006.01)

(52) U.S. Cl.
CPC ............ *A62B 23/02* (2013.01); *A62B 18/084* (2013.01)

(58) Field of Classification Search
CPC ....... A62B 23/02; A62B 18/084; A62B 23/00; A62B 23/025; A62B 18/00; A62B 18/006; A62B 18/02; A41D 13/11; A41D 13/1115; A41D 13/1123; B01D 46/52; B01D 46/023; B01D 2239/065; B01D 2239/069; B01D 46/521; B01J 20/28038
See application file for complete search history.

(56) References Cited

U.S. PATENT DOCUMENTS 4,807,619 A * 2/1989 Dyrud .................. B01D 39/163 128/206.16
5,531,892 A * 7/1996 Duffy ................. B01D 46/0016 55/497
5,674,302 A 10/1997 Nakayama
(Continued)

FOREIGN PATENT DOCUMENTS

DE 3639636 5/1988
EP 0052813 6/1982
(Continued)

OTHER PUBLICATIONS

International Search Report for PCT International Application No. PCT/IB2019/051727, dated Jun. 14, 2019, 5 pages.

*Primary Examiner* — Colin W Stuart
*Assistant Examiner* — Douglas Y Sul

(57) ABSTRACT

A filter according to an embodiment include a filter main body provided with a sheet member, and a border portion of the filter main body includes a first region bent at least one time, and a second region formed in a flat shape and provided to be bendable and to provide softness to the filter main body.

11 Claims, 7 Drawing Sheets

(A-A')

(56) References Cited

U.S. PATENT DOCUMENTS

| | | | | |
|---|---|---|---|---|
| 5,679,122 | A * | 10/1997 | Moll | B01D 46/10 55/497 |
| 5,720,790 | A | 2/1998 | Kometani | |
| 5,993,580 | A | 11/1999 | Nakayama | |
| 6,161,540 | A * | 12/2000 | Fecteau | B01D 39/1623 128/206.16 |
| 6,511,623 | B1 | 1/2003 | Ueda | |
| 6,923,182 | B2 * | 8/2005 | Angadjivand | A41D 13/1146 128/206.16 |
| 7,993,422 | B2 | 8/2011 | Krisko | |
| 9,719,939 | B2 | 8/2017 | Krebs | |
| 10,178,932 | B2 * | 1/2019 | Sauer | A47L 11/4019 |
| 2004/0055604 | A1 * | 3/2004 | Viner | A62B 23/02 128/206.16 |
| 2004/0079367 | A1 | 4/2004 | Goldblatt | |
| 2005/0139217 | A1 * | 6/2005 | Chiam | A41D 13/1123 128/205.27 |
| 2007/0057208 | A1 | 3/2007 | Joss | |
| 2011/0061656 | A1 | 3/2011 | Matich | |
| 2011/0069878 | A1 | 3/2011 | Case | |
| 2011/0138760 | A1 * | 6/2011 | Sundet | B01D 46/523 55/486 |
| 2013/0047563 | A1 * | 2/2013 | Sauer | A47L 9/1436 55/378 |
| 2014/0033665 | A1 * | 2/2014 | Smithies | B32B 5/022 55/486 |
| 2015/0335080 | A1 * | 11/2015 | Giles | A41D 13/1115 29/451 |
| 2016/0361679 | A1 * | 12/2016 | Billingsley | B01J 20/22 |

FOREIGN PATENT DOCUMENTS

| | | | | |
|---|---|---|---|---|
| EP | 0582286 | | 2/1994 | |
| EP | 1712897 | | 10/2006 | |
| EP | 3066943 | | 9/2016 | |
| GB | 527851 | | 10/1940 | |
| JP | 2015100570 | | 6/2015 | |
| KR | 20030075542 | A | 9/2003 | |
| WO | WO 2001-003775 | | 1/2001 | |
| WO | WO 2008-024611 | | 2/2008 | |
| WO | WO 2017-004313 | | 1/2017 | |
| WO | WO-2017004313 | A1 * | 1/2017 | A62B 18/006 |
| WO | WO-2018118840 | A1 * | 6/2018 | A62B 19/00 |

* cited by examiner

FILTER AND MASK

CROSS REFERENCE TO RELATED APPLICATIONS

This application is a national stage filing under 35 U.S.C. 371 of PCT/IB2019/051727, filed Mar. 4, 2019, which claims the benefit of Korean Application No. 10-2018-0027305 filed, the disclosure of which is incorporated by reference in its/their entirety herein.

The present disclosure relates to a filter and a respiratory device, such as a mask, having the filter operably attached thereto.

BACKGROUND

Volumes of airborne fine dust are increasing because of increased burning of fossil fuels and industrialization. Some of the fine dust may include various undesirable compounds and heavy metals, which may be harmful when inhaled by humans.

Therefore, masks including filters for filtering the air to prevent fine dusts from entering the human bodies are increasingly used.

SUMMARY

The present disclosure provides a filter having good softness and a mask having the same.

According to one aspect of the present disclosure, there is provided a filter including a filter main body provided with a sheet member, wherein a border portion of the filter main body includes a first region bent at least one time, and a second region formed in a flat shape and provided to be bendable and to provide softness to the filter main body, and a mask having the same.

According to an embodiment of the present disclosure, there is provided a filter having softness.

DETAILED DESCRIPTION

Figure 1:
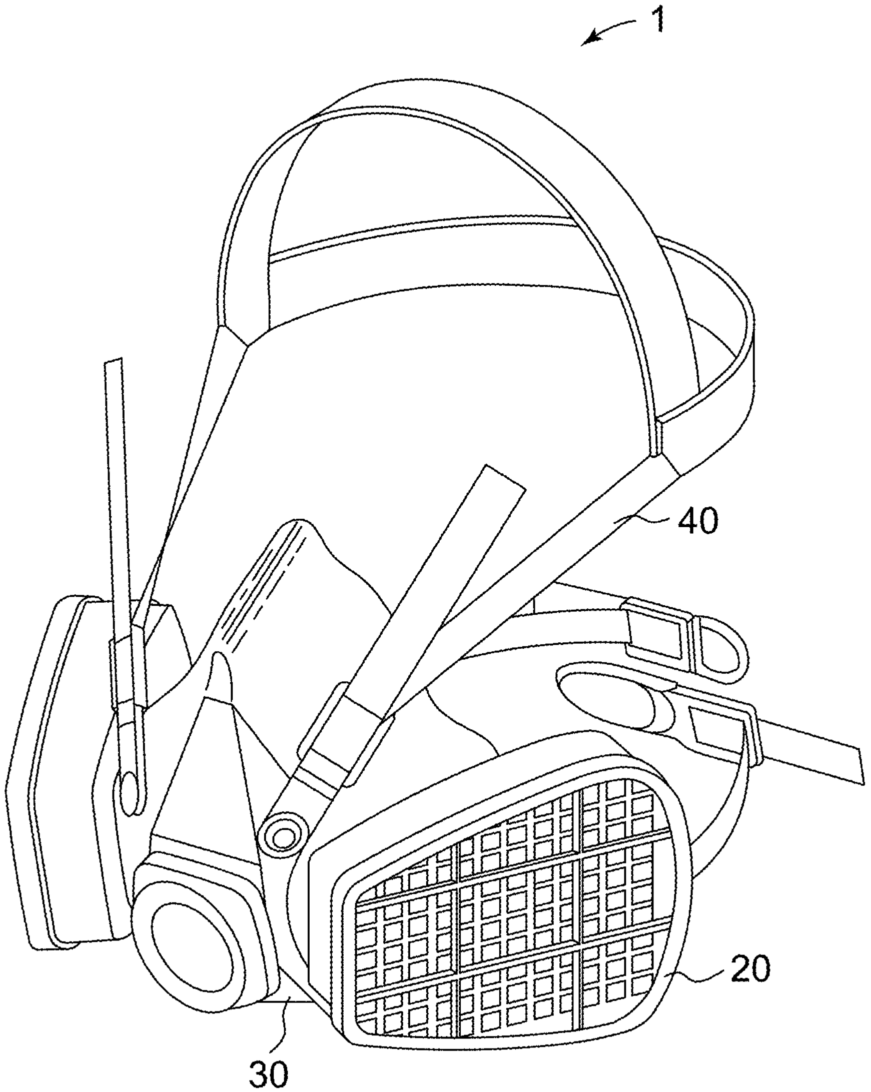
FIG. 1 is a perspective view illustrating a mask according to an embodiment of the present disclosure.

Hereinafter, specific embodiments for implementing the concept of the present disclosure will be described in detail with reference to the drawings. Herein, it should be noted that the drawings are not drawn at a constant ratio for convenience of explanation. Further, in explaining the present disclosure, any specific explanation on a well-known related configuration or function deemed to obscure the gist of the present disclosure will be omitted.

In addition, throughout the description, the expressions "one side," "the other side," "upper," "lower," "left," "right," and the like are described with reference to illustrations in the drawings, and it is to be noted that these may be expressed differently when the orientation of a corresponding object is changed.

Figure 2:
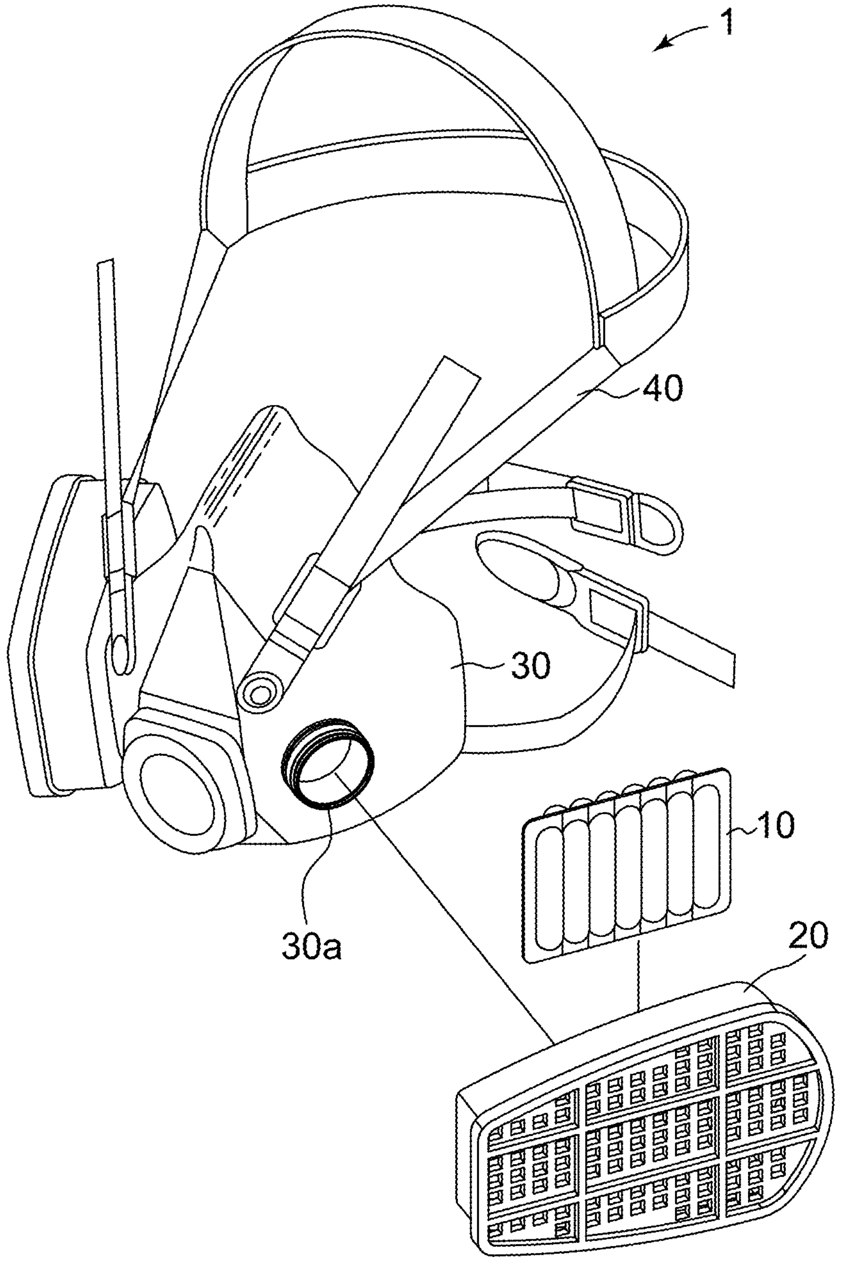
FIG. 2 is an exploded perspective view illustrating the mask according to an embodiment of the present disclosure.
Figure 3:
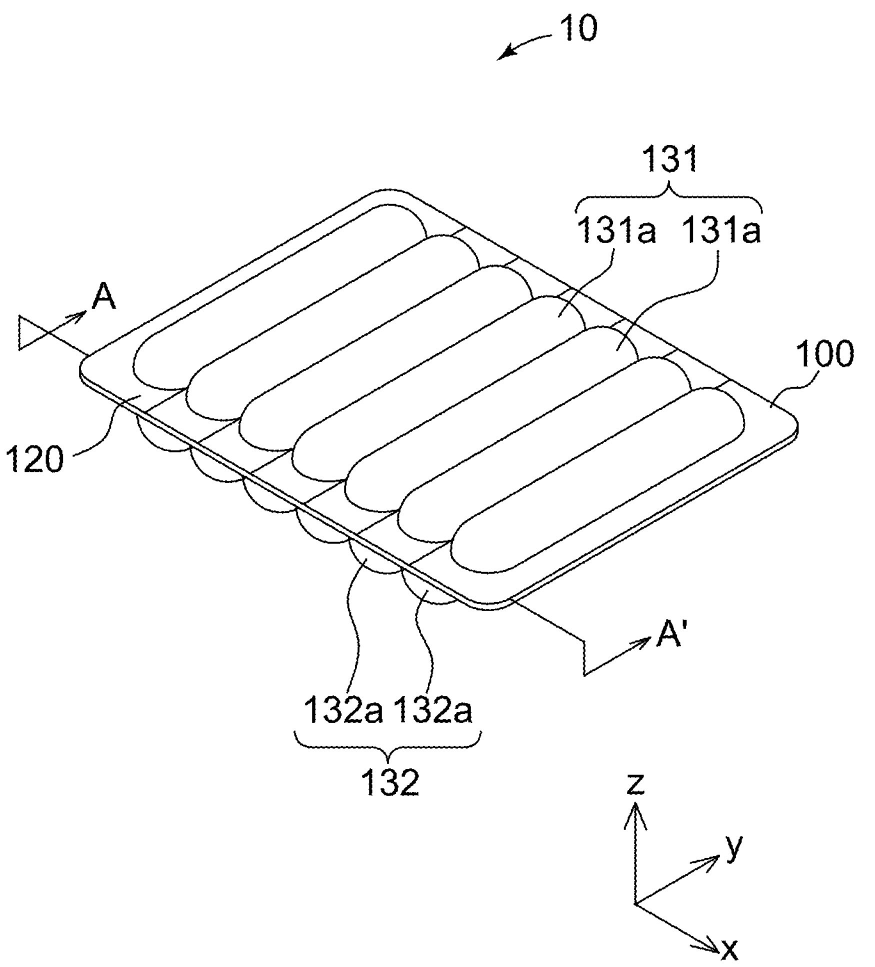
FIG. 3 is a perspective view illustrating a filter according to an embodiment of the present disclosure.
Figure 4:
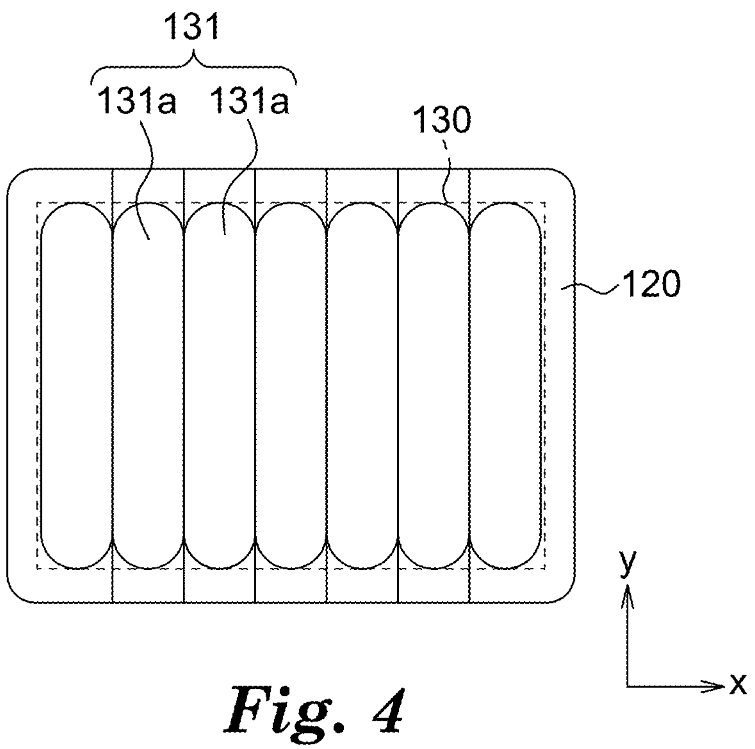
FIG. 4 is a top view of the filter illustrated in FIG. 3 as seen from above along the "z" axis.
Figure 5:
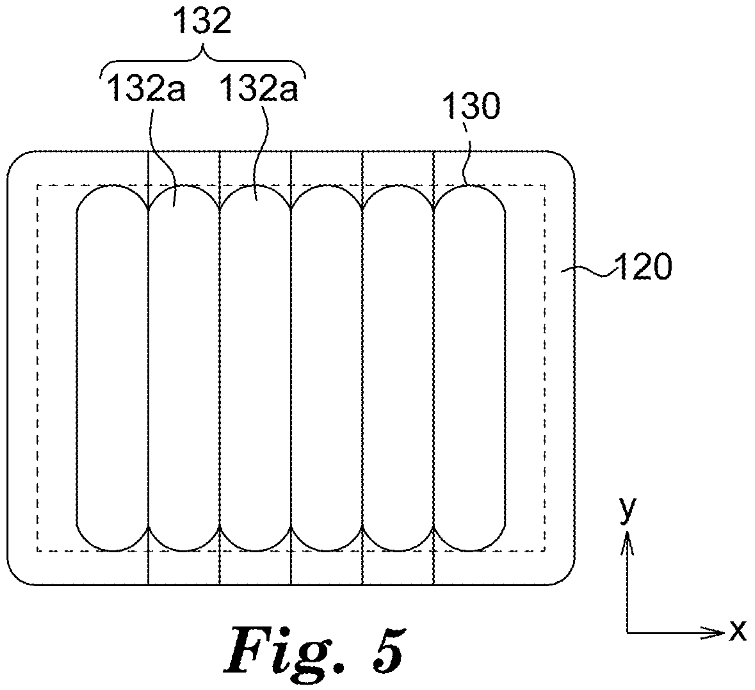
FIG. 5 is a bottom view of the filter illustrated in FIG. 3 as seen from the bottom along the "z" axis.
Figure 6:
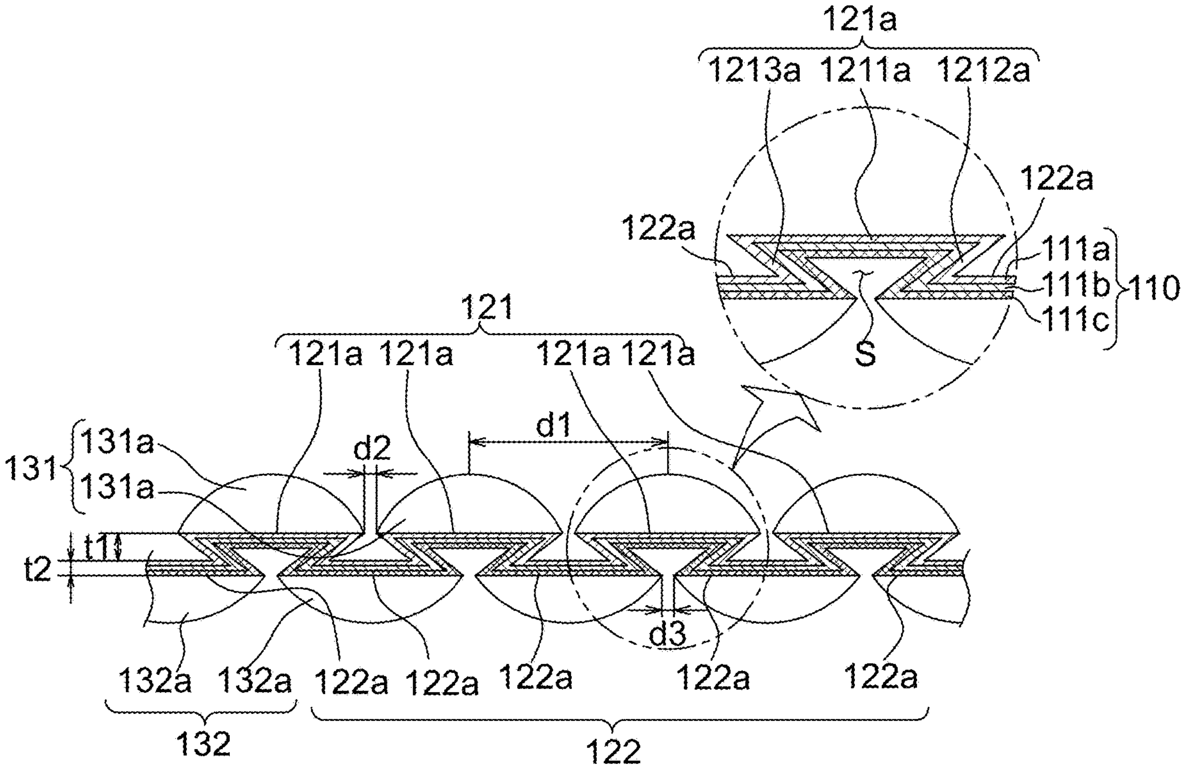
FIG. 6 is a cross-sectional view taken along the line A-A' of FIG. 3.
Figure 7:
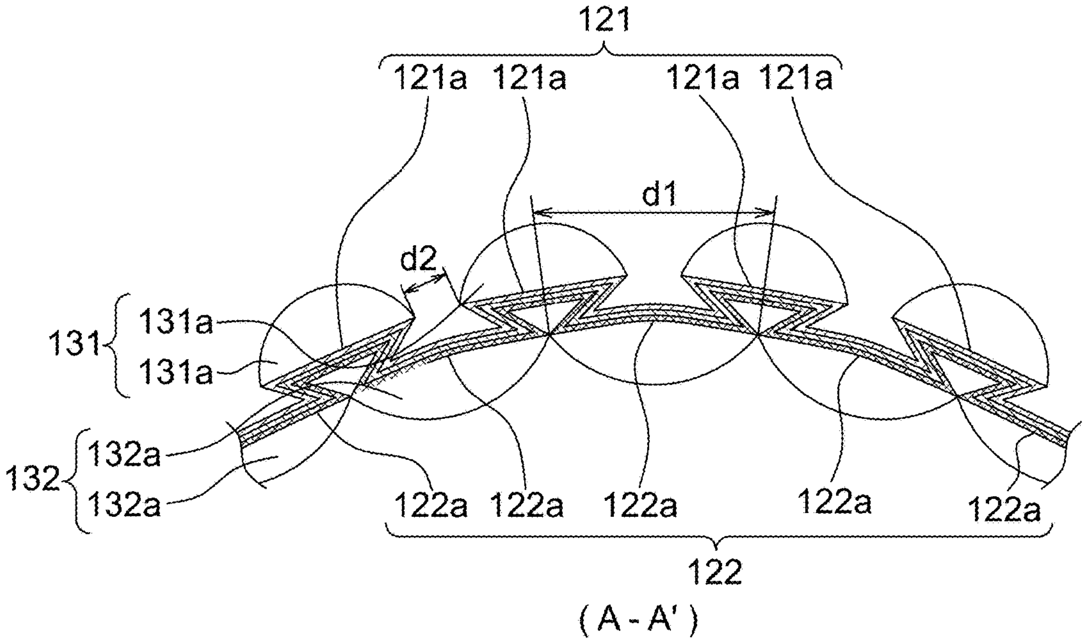
FIG. 7 is a view illustrating the filter of FIG. 6 in a bent state.
Figure 8:
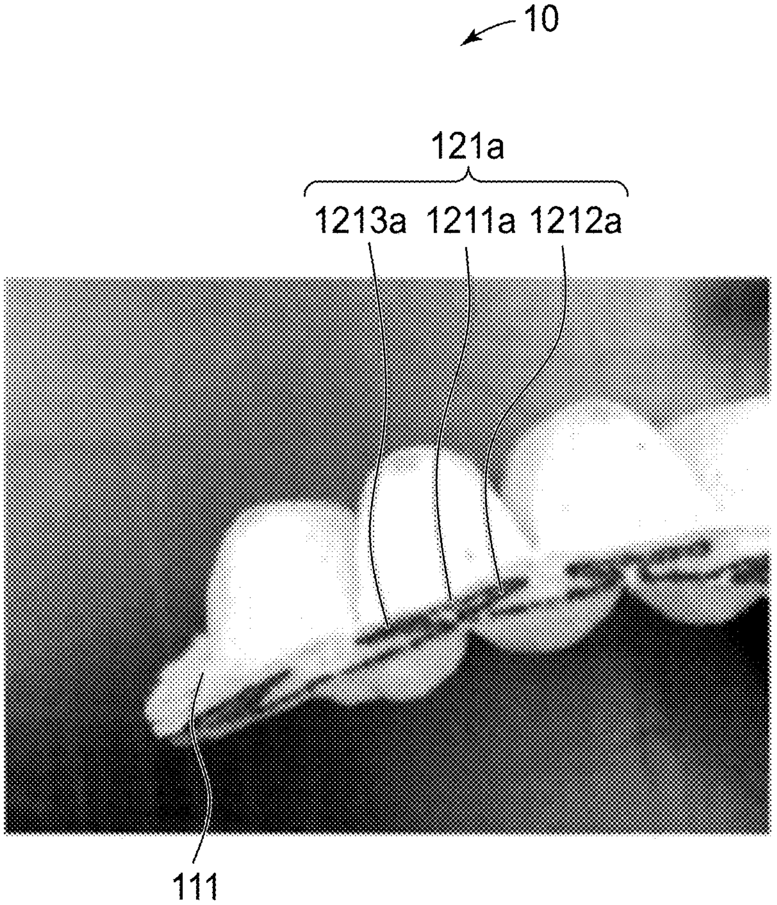
FIG. 8 is a photo illustrating the filter according to an embodiment of the present disclosure.

FIG. 1 is a perspective view illustrating a mask according to an embodiment of the present disclosure, FIG. 2 is an exploded perspective view illustrating the mask according to an embodiment, FIG. 3 is a perspective view illustrating a filter according to an embodiment, FIG. 4 is a top view of the filter illustrated in FIG. 3 as seen from the front, FIG. 5 is a top view of the filter illustrated in FIG. 3 as seen from bottom, FIG. 6 is a cross-sectional view taken along the line A-A' of FIG. 3, FIG. 7 is a view illustrating the filter illustrated in FIG. 6 in a bent state, and FIG. 8 is a photo illustrating the filter according to an embodiment.

Referring to FIGS. 1 and 2, the mask 1 according to an embodiment may include a filter 10 (not shown in FIG. 1), a filter case 20, and a main body 30. A strap 40 may be coupled to the main body 30, and a wearer may wear the mask 1 in close contact with their face by fixing the strap 40 to wearer's head. The filter 10 may be selected from one of a polygonal shape and a circular shape. The filter 10 may include a filter main body 100 (as shown in FIG. 3) to prevent foreign substances, such as fine dust in the air, from entering the lungs of the wearer.

Referring to FIGS. 3 to 6, the filter main body 100 may be formed of a sheet member 110. The sheet member 110 may be formed with a single layered structure including one sheet, or may be formed with a multi-layered structure in which a plurality of sheets 111*a*, 111*b*, 111*c* are stacked one on another. For example, the sheet member 110 may be manufactured by stacking the plurality of sheets 111*a*, 111*b*, 111*c* including a non-woven fabric filter material, an active carbon filter material, a static synthetic fiber filter material, or the like to filter fine dust or the like while allowing air to pass therethrough.

The filter main body 100 may be divided into a border portion 120 and a border inside portion 130 corresponding to the inside of the border portion 120. Herein, the border portion 120 may include a first region 121 bent at least one time, and a second region 122 formed in a flat shape and provided to be bendable and to provide softness to the filter main body 100.

The first region 121 and the second region 122 may be formed by fusing the border portion 120 in at least one fusion method such as thermal fusion, laser fusion, ultrasonic fusion, vibration fusion, and infrared fusion.

The first region 121 may include a plurality of first region pieces 121*a* arranged along the border portion 120. The second region 122 may include a plurality of second region pieces 122*a* arranged along the border portion 120. The second region piece 122*a* may be arranged between the first region pieces 122*a* arranged adjacent to each other.

Referring to FIG. 6, each of the first region pieces 121*a* of the first region 121 may include a horizontal portion 1211*a* formed in parallel with the second region piece 122*a*, which is arranged between the first region pieces 121*a* and corresponds thereto, a first extension portion 1212*a* connecting one side of the horizontal portion 1211*a* and any one of the corresponding second region pieces 122*a*, and a second extension portion 1213*a* connecting the other side of the horizontal portion 1211*a* opposite to the one side, and another of the corresponding second region pieces 122*a*. For example, when the horizontal portion 1211*a* is viewed in a direction perpendicular to the extending direction of the horizontal portion 1211*a*, at least part of the horizontal portion 1211*a* may be coupled to overlap the first extension portion 1212*a* and the second extension portion 1213*a*. The coupled portion, for example, a portion where the horizontal portion 1211*a* and the first extension portion 1212*a* or the second extension portion 1213*a* overlap each other, may be bonded or fused. Stiffness may be enhanced stronger by bonding or fusing than before bonding or fusing.

In some embodiments, a space "s" may be formed by the horizontal portion 1211*a*, the first extension portion 1212*a*, and the second extension portion 1213*a*. Referring to FIG. 8, in some embodiments, the space "s" may not be formed by the horizontal portion 1211*a*, the first extension portion 1212*a*, and the second extension portion 1213*a* according to a type and thickness of the sheet 111 forming the filter 10. Further, referring to FIG. 6, in some embodiments, the adjacent first region pieces 121*a* are spaced apart from each other by a distance "d2", and the adjacent second region pieces 122*a* are spaced apart from each other by a distance "d3". In some embodiments, the adjacent first region pieces 121*a* and/or the adjacent second region pieces 122*a* may contact each other, and thus the distances "d2" and "d3", individually or both, may be 0.

In some embodiments, the first region piece 121*a* may be formed with the plurality of sheets 111*a*, 111*b*, 111*c* being stacked on one another and being bent at least one time to overlap each other. Therefore, the stiffness of the first region piece 121*a* can be enhanced, and may not be folded when the filter main body 100 is bent.

In some embodiments, a thickness "t2" of the second region piece 122*a* may be thinner than a thickness "t1" of the first region piece 121*a*.

The second region piece 122*a* may be formed to have relatively lower stiffness than that of the first region piece 121*a*. In some embodiments, the stiffness of the second region piece 122*a* may be relatively weaker than the stiffness of the first extension portion 1212*a* and the second extension portion 1213*a*. As shown in FIG. 7, the filter main body 100 (not shown in FIG. 7) may be bent according to the bending of each of the second region pieces 122*a*. For example, when an external force is applied, the second region pieces 122*a*, which have relatively weak stiffness, may further be bent than the first region pieces 121*a*. In other words, softness or pliability of the filter main body 100 can be guaranteed by the second region pieces 122*a*.

Referring again to FIGS. 3 and 4, in some embodiments, the filter 10 may include at least one first convex portion 131 protruding from one surface of the filter main body 100. For example, the first convex portion 131 may protrude upwardly (in the "z" axis direction) from the border inside portion 130 of the filter main body 100, and may be extended in a lateral direction ("y" axis direction). For example, the at least one first convex portion 131 may connect the first region piece 121*a* formed on one side border portion of the filter main body 100, and the first region piece 121*a* formed on the other side border portion of the filter main body 100 formed opposite the one side border portion. Referring to FIG. 4, the first convex portion 131 may connect the first region pieces 121*a* formed on both side border portions facing each other when taken along the "y" axis direction.

The first convex portion 131 may include a plurality of first convex portion pieces 131*a*. Referring to FIGS. 6 and 7, a distance "d1" between the first convex portion pieces 131*a* arranged adjacent to each other may increase as the second region piece 122*a* formed between the adjacent first convex portion pieces 131*a* is bent. Herein, the distance "d1" between the first convex portion pieces 131*a* may refer to a direct distance connecting peaks of the adjacent first convex portion pieces 131*a*.

Referring to FIGS. 3 and 5, the filter 10 (not shown in FIG. 3) may include a second convex portion 132 protruding from the other surface of the filter main body 100. For example, the second convex portion 132 may protrude from the border inside portion of the filter main body 100 in the opposite direction of the first convex portion 131, and may be extended in the lateral direction (y direction). The second convex portion 132 may connect the second region piece 122*a* formed on one side border portion of the filter main body 100, and the second region piece 122*a* formed on the other side border portion of the filter main body 100 formed opposite the one side border portion. Referring to FIG. 5, the second convex portion 132 may connect the second region pieces 122*a* formed on both side border portions facing each other when taking along the "y" axis direction.

The second convex portion 132 may include a plurality of second convex portion pieces 132*a*. Referring to FIG. 6, in some embodiments, the first region piece 121*a* formed between the second convex portion pieces 132*a* arranged adjacent to each other is symmetrically formed with respect to a vertical surface perpendicular to the filter main body 100, and the adjacent second convex portion pieces 132*a* may be symmetrically arranged with respect to the vertical surface.

Figure 9:
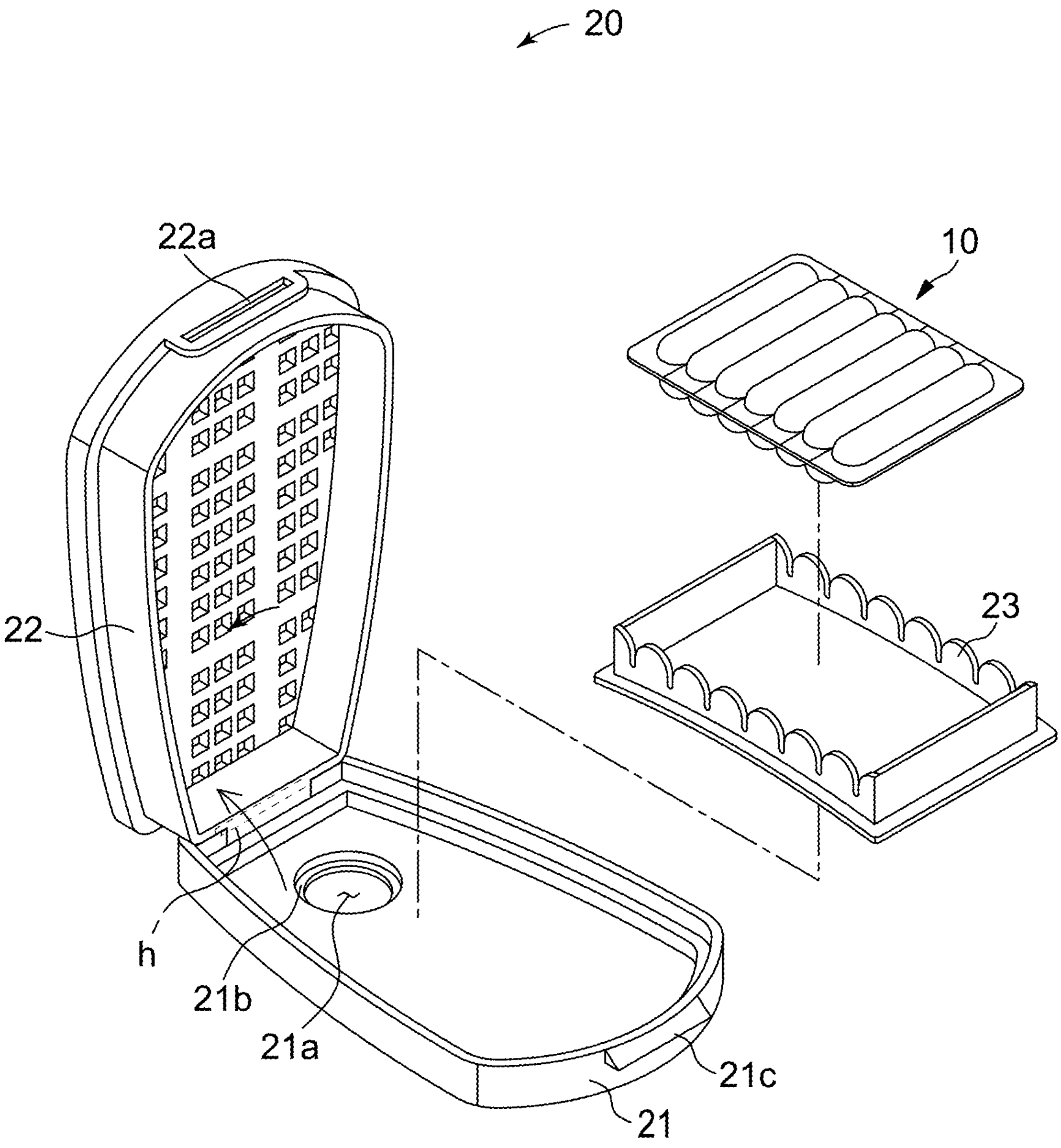
FIG. 9 is an exploded perspective view illustrating a filter case provided in the mask according to an embodiment of the present disclosure.

In some embodiments, the presently disclosed filter 10 may be accommodated in the filter case 20. For example, in some embodiments, the presently disclosed filter 10 is at least partially contained in the filter case 20. In some embodiments, the presently disclosed filter 10 is completely enclosed by the filter case 20. Referring to FIG. 9, there is shown an exploded perspective view illustrating the presently disclosed filter mounted on or dismounted from a respiratory device, such as a mask. In some embodiments, the filter case 20 may accommodate the filter 10 and may be removably coupled to the main body 30. For example, in some embodiments, the filter case 20 may be manufactured in a shape corresponding to the shape of the filter 10.

In some embodiments, the filter case 20 may include a base member 21, a cover member 22 provided to be pivotable with respect to the base member 21, and a support member 23 selectively accommodated in the base member 21.

In some embodiments, the base member 21 is provided to accommodate the filter 10, and may be formed to have an upper surface opened, for example. In some embodiments, the base member 21 is provided with a penetrating hole 21*a* to allow the inner space of the base member 21 to fluidly communicate with the main body 30.

In some embodiments, the base member 21 may have a filter case-side fastening portion 21*b* formed on an outer surface thereof, that is, a surface contacting the main body 30, to be fastened with the main body 30. For example, in some embodiments, the filter case-side fastening portion 21*b* may be extended from an outer circumference of the penetrating hole 21*a* toward the main body 30.

In some embodiments, the cover member 22 is provided to prevent the filter 10 seated in the support member 23 accommodated in the base member 21 from being released from the base member 21, and may pivot about a hinge shaft "h".

In some embodiments, one end of the cover member 22 in the lengthwise direction may be coupled to one end of the base member 21 in the lengthwise direction by means of a hinge, and the other end of the cover member 22 in the lengthwise direction may be selectively locked into the other end of the base member 21 in the lengthwise direction. For example, a locking protrusion 21*c* formed on the other end of the base member 21 may be locked into or unlocked from a locking recess 22*a* formed on the other end of the cover member 22, such that the cover member 22 can be closed or opened with respect to the base member 21.

In some embodiments, the support member 23 may be provided to support the filter 10. For example, the support member 23 may be formed by over-molding along the border portion 130 of the filter 10. In some embodiments, the support member 23 may be separately formed by injection molding, and then the filter 10 may be seated on and coupled to one surface of the support member 23.

In some embodiments, the support member 23 may be manufactured by an elastic material such as thermo plastic elastomer (TPE), for example. However, this is merely an example, and the concept of the present disclosure is not limited by the type of the support member 23, for example, a material or a shape of the support member 23.

In some embodiments, the main body 30 is a portion that is provided to be wearable on wearer's face, and may cover a mouth region and a nose region of the wearer, and may be extended to a cheek region and a chin region to cover the wearer's cheek and chin. For example, the main body 30 may include a portion protruding therefrom to be further away from the wearer's face to prevent the wearer from feeling uncomfortable. Referring to FIG. 2, in some embodiments, the main body 30 may be provided with a main body-side fastening portion 30*a* to be fastened to the filter case-side fastening portion 21*b* of the filter case 20, and the main body-side fastening portion 30*a* may be formed on a portion corresponding to the cheek region of the wearer.

The following is a list of embodiments of present disclosure.

Item 1 relates to a filter including a filter main body provided with a sheet member, wherein a border portion of the filter main body includes a first region bent at least one time, and a second region formed in a flat shape and provided to be bendable and to provide softness to the filter main body.

Item 2 relates to the filter, wherein the sheet member is formed with a multi-layered structure in which a plurality of sheets are stacked on one another.

Item 3 relates to the filter, wherein the first region includes a plurality of first region pieces arranged along the border portion, wherein the second region includes a plurality of second region pieces arranged along the border portion, and wherein the second region piece is provided between the first region pieces arranged adjacent to each other.

Item 4 relates to the filter, further including a first convex portion protruding from one surface of the filter main body, wherein the first convex portion connects the first region piece formed on one side border portion of the filter main body, and the first region piece formed on a border portion formed opposite the one side border portion.

Item 5 relates to the filter, wherein the first convex portion includes a plurality of first convex portion pieces, and wherein a distance between the first convex portion pieces disposed adjacent to each other increases as the second region piece formed between the adjacent first convex portion pieces is bent.

Item 6 relates to the filter, further including a second convex portion protruding from the other surface of the filter main body, wherein the second convex portion connects the second region piece formed on one side border portion of the filter main body, and the second region piece formed on a border portion formed opposite the one side border portion.

Item 7 relates to the filter, wherein the second convex portion includes a plurality of second convex portion pieces, wherein the first region piece provided between the second convex portion pieces arranged adjacent to each other is symmetrically formed with respect to a vertical surface perpendicular to the filter main body, and wherein the adjacent second convex portion pieces are symmetrically arranged with respect to the vertical surface.

Item 8 relates to the filter, wherein each of the first region pieces includes: a horizontal portion formed in parallel with the second region piece which is arranged between the first region pieces and corresponds thereto; a first extension portion connecting one side of the horizontal portion and any one of the corresponding second region pieces; and a second extension portion connecting the other side of the horizontal portion opposite to the one side of the horizontal portion, and another one of the corresponding second region pieces.

Item 9 relates to the filter, wherein the horizontal portion is coupled to the first extension portion and the second extension portion to overlap each other at least in part.

Item 10 relates to the filter, wherein a thickness of the second region piece is thinner than a thickness of the first region piece.

Item 11 relates to the filter, wherein the first region and the second region are formed by fusing the border portion by at least one fusion method among thermal fusion, laser fusion, ultrasonic fusion, vibration fusion, and infrared fusion.

Item 12 relates to a mask including: a filter; a filter case accommodating the filter; and a main body to which the filter case is coupled and which is provided to be wearable on a user's face.

Item 13 relates to the mask, wherein the filter is formed in any one shape of a circular shape and a polygonal shape.

Item 14 relates to the mask, including: a base member coupled to the main body; a cover member pivotably coupled to the base member; and a support member supporting the filter and accommodated in the base member.

Item 15 relates to the mask, wherein the support member is over-molded along the border portion of the filter.

EXAMPLES

Example 1

A filter sample was created in which the border portion 120 has a first region 121 and a second region 122, where the second region 122 has a thinner thickness than that of the first region 121; a first convex portion 131 protruding from one surface of the border portion 120 inside portion 130; and a second convex portion 132 protruding from the opposite major surface of the border portion 120 inside portion 130.

Comparison Example 1

A filter sample having a generally circular shape was created. A border portion of the filter sample according to Comparison Example 1 was completely fused, and thus thicknesses of fused portions were the same, and an inside of the border portion had a flat shape.

Comparison Example 2

A filter sample having a generally rectangular shape was created. A border portion of the filter sample according to Comparison Example 2 was completely fused, and thus thicknesses of fused portions were the same, and a bending portion of a wave shape was continuously formed in the inside of the border portion.

Measurement of Stiffness

Samples made according to the descriptions for Example 1, Comparison Example 1, and Comparison Example 2 were cut by 1.5" (3.81 cm) in the horizontal direction and by 1" (2.54 cm) in the vertical direction.

Next, cut end portions of these samples were clamped to a stiffness test device (commercially available under trade designation "4171E" from manufactured by Gurley Precision Instruments, Troy, N.Y.), and then the cut other end portions of the samples according to the example and the comparison examples were reciprocated horizontally, and then stiffnesses (mg) of the samples were measured. The results of the measurement are as shown in Table 1.

TABLE 1

| Classification | Stiffness (mg) |
|---|---|
| Comparison Example 1 | 6934.2 |
| Comparison Example 2 | Unmeasurable |
| Example 1 | 1555.7 |

Referring to Table 1, the stiffness of the sample according to Example 1 was reduced by about 77.5% in comparison to the stiffness of the sample according to Comparison Example 1. Herein, "unmeasurable" means that the sample according to Comparison Example 2 has a stiffness that is unmeasurable by the stiffness test device, such that the sample is not bent.

When compared to Comparison Examples 1 and 2 in which the border portion is fused to have the same thickness, Example 1 in which the border portion is fused to have different thicknesses has noticeably low stiffness of the sample, and has good softness.

Although the filter and the mask having the same according to the embodiments of the present disclosure have been described by referring to specific embodiments, these are merely certain examples, and the present disclosure is not limited thereto, and should be interpreted as having the broadest scope according to the basic idea disclosed herein.

Those skilled in the art will be able to combine and/or substitute the disclosed embodiments to effect a pattern of a shape that has not been stated herein, but this also does not depart from the scope of the present disclosure. Further, it will be apparent to those skilled in the art that various changes or modifications can be readily made to embodiments disclosed based on the descriptions, and such changes or modifications belong to the right scope of the present disclosure.

What is claimed is:

1. A filter comprising a filter main body having a first major surface and a second major surface opposite the first major surface, the filter main body comprising an inside portion and a border portion bordering the inside portion, wherein the inside portion comprises a sheet member bent with overlapping bends to form a first region associated with the first major surface, and a second region associated with the second major surface;

wherein the first region comprises a plurality of first region pieces separated by overlapping bends in the sheet member, wherein the filter further comprises discrete convex portions associated with first region pieces protruding from the first major surface, and the second region comprises a plurality of second region pieces associated with the second major surface, and wherein the second major pieces are positioned between the bends that separate the first region pieces.

2. The filter of claim 1, wherein the sheet member is formed with a multi-layered structure in which a plurality of sheets are stacked one on another.

3. The filter of claim 1:

wherein a distance between the first region pieces disposed adjacent to each other increases as the filter main body is bent so as to compress the second major surface.

4. The filter of claim 1, further comprising:

second convex portions associated with the second region pieces and protruding from the second major surface.

5. The filter of claim 4:

wherein the first region pieces are individually symmetrically formed with respect to a vertical axis perpendicular to the filter main body.

6. The filter of claim 5, wherein convex portions associated with the first region pieces have a thickness that is thinner than a thickness convex portions associated with the second region pieces.

7. The filter of claim 1, wherein the first region and the second region are formed by fusing the border portion by at least one fusion method selected from the following: thermal fusion, laser fusion, ultrasonic fusion, vibration fusion, and infrared fusion.

8. A mask comprising:

a filter according to claim 1;

a filter case accommodating the filter; and a main body to which the filter case is coupled and which is provided to be wearable on a user's face.

9. The mask of claim 8, wherein the filter is formed in any one shape of a circular shape and a polygonal shape.

10. The mask of claim 8, wherein the filter case comprises:

a base member coupled to the main body; and a cover member pivotably coupled to the base member.

11. The mask of claim 8:

further comprising a support member supporting the filter and accommodated in a base member, wherein the support member is over-molded along a border portion of the filter.

* * * * *